United States Patent [19]

Warman

[11] Patent Number: 4,696,400

[45] Date of Patent: Sep. 29, 1987

[54] KIT FOR CREATING WALL MURALS

[76] Inventor: Leigh Warman, 81 Penshurst Gardens, Edgware, Middlesex, England

[21] Appl. No.: 783,000

[22] Filed: Oct. 2, 1985

[51] Int. Cl.[4] ........................ B65D 71/00; G03B 29/00

[52] U.S. Cl. ...................................... 206/575; 206/576; 353/119; 353/121; 353/122; 434/84; 434/88

[58] Field of Search ........................ 206/575, 576, 578; 434/84, 88; 353/119, 121, 122; 350/121, 122

[56] References Cited

U.S. PATENT DOCUMENTS 1,771,509 7/1930 Ott .................................. 353/122 X 3,372,493 3/1968 Birch ..................................... 434/84

FOREIGN PATENT DOCUMENTS 1352200 5/1974 United Kingdom .

*Primary Examiner*—Evan K. Lawrence

*Attorney, Agent, or Firm*—Klein & Szekeres

[57] ABSTRACT

Wall murals are readily achieved by the do-it-yourself exponent with the use of apparatus contained in a kit. The kit of the invention includes a case which has brackets enabling the case to be supported on a wall or stabilized on a table or the like. Inside the case is a projector and a slide transparency bearing an outline of the intended mural in which different areas are designated according to the color intended for that area. The case includes a series of paint pots each containing a different corresponding colored paint and each bearing the corresponding designation of the paint color. To produce the mural the image of the slide is projected onto the wall and the different areas are painted with a different colored paint in accordance with the indicated designations.

5 Claims, 3 Drawing Figures

KIT FOR CREATING WALL MURALS

BACKGROUND OF THE INVENTION

1. Field of the Invention

The present invention relates to a Kit for creating wall murals.

2. Brief Description of the Prior Art

It has been previously proposed in UK patent specification No. 1,352,200 to create embroidery patterns by creating a photographic slide of the pattern required to be embroidered and to project an image of the slide on a backcloth and then to follow the pattern with embroidery stitches.

It has also been proposed to provide a card or canvas of a scene or picture to be painted on which the areas to be painted in different colors are identified by border lines and with numbers representing the different colors.

Neither of these methods are suited to the drawing of murals on walls.

SUMMARY OF THE INVENTION

It is an object of the invention to provide a kit for creating wall murals.

According to the present invention there is provided a kit for producing a wall mural, the kit having components comprising:

- a transparency bearing an image which is divided into a plurality of discrete areas, each area having a selected one of a plurality of different designations, each designation representing a different one of a plurality of different colors;
- a plurality of containers each designated with a said designation and each containing the paint having a color corresponding to the designation;
- a projector for projecting the image of the transparency onto a selected wall; and
- brushes for painting the wall with the paint from the containers in accordance with the indicated designations to reproduce on the wall the image carried by the transparency.

BRIEF DESCRIPTION OF THE DRAWINGS

A kit and method of using the kit for creating wall murals will now be described by way of example with reference to the accompanying diagrammatic drawings in which.

DESCRIPTION OF THE PREFERRED EMBODIMENT

Figure 1:
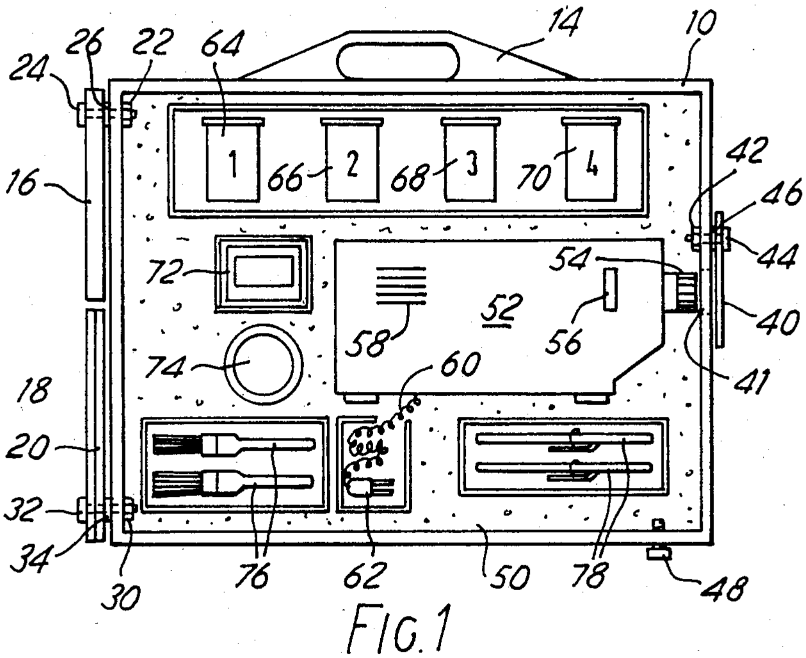
FIG. 1 is a side elevation of the apparatus of the kit with the cover removed.

The kit shown in FIG. 1 comprises apparatus primarily intended for the do-it-yourself exponent to enable the exponent to create large wall murals (for example of animated characters) without the need to acquire the artistic skills commonly possessed by artistic experts who create such murals by free hand.

As shown in FIG. 1, the kit comprises a case or housing 10 having a cover 12 which can be secured to the remainder of the housing 10 in the manner of a lid of a convention suitcase.

The case 10 has a carrying handle 14. Mounted on the rear of the case 10 is an upper support bracket 16 and a pair of lower support brackets 18 and 20.

The upper support bracket 16 is secured to the case by a nut 22 and bolt 24. A friction pad 26 interposed between the bracket 16 and the case 10 enables the bracket 16 to be pivoted about the bolt 24 from a retracted position albeit somewhat stiffly (shown in FIG. 1) to the extended position shown in FIG. 2.

Figure 2:
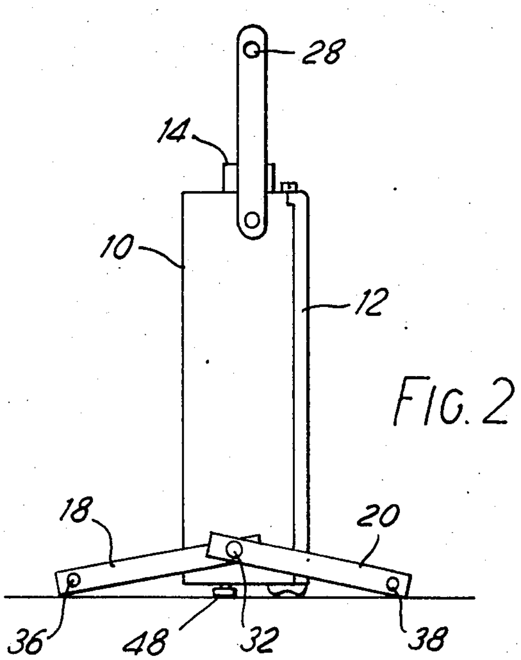
FIG. 2 is a rear view of the apparatus of the kit mounted on a working surface.

At its distal end the bracket 16 has a securing hole 28 (see FIG. 2).

The two lower brackets 18 and 20 are secured by a common nut 30 and bolt 32 to the case 10. A friction pad 34 interposed between the brackets and the case 10 enables the brackets 18 and 20 to be pivoted about the axis of the bolt 32 from a retracted position (shown in FIG. 1) to a table top support position (shown in FIG. 2) or to a wall support position, in which both brackets are again parallel, (shown in FIG. 3). Each bracket 18 and 20 has a respective support hole 36 and 38.

A cover member 40 is mounted on the opposite end of the case 10 to cover an opening 41 by a nut 42 and bolt 44. A friction pad 46 interposed between the cover member 40 and the case 10 will hold the cover member 40 in any angular position into which it shifted so as to maintain the opening 41 opened or closed as desired.

A screw threaded foot 48 is in screw-threaded engagement with the underside of the case 10 at a location remote from the lower brackets 18 and 20. The foot 48 enables the attitude of the case 10 to be changed when mounted on a table (see FIG. 2).

The case 10 is filled with an expanded polystyrene block 50 which is profiled to define a plurality of recesses of different shapes and sizes to accommodate a variety of components.

A generally central recess is fitted with a commercially available slide projector 52 which is so positioned that its lens 54 lies adjacent the opening 41 and it stands generally upright when the case 10 is positioned in the upright state. When the cover 40 is displaced to reveal the opening 41 the projector 52 can be operated in situ to project an image of a transparency onto a wall or the like through the opening 41.

The projector 52 is provided with a slide carrier 56, ventilation slots 58 and a length of flex or cable 60 terminating in a plug 62 which is normally coiled up and located in another recess in the block 50.

Another recess in the block 50 contains four paint containers 64 through 70 each designated with a different number and each containing a different colored paint.

Two further recesses in the block 50 contain respective pairs of paint brushes and pencils 78.

A set of slide transparencies 72 containing images depicting different animated scenes are located in yet another recess while a bowl 74 for washing the brushes is located in yet a further recess.

Each slide transparency which is preferably of the 35 mm variety is provided with the outline, for example, of an animated character, and the outline of perhaps some basic background material for example a large sun or a tree. Each area of the image intended to have a different color bears a number corresponding to the color intended for that area and contained in a container bearing a corresponding number.

In operation, to draw a wall mural, the case is either mounted on an appropriate wall or close to the appropriate wall on a support surface such as that provided by a table.

When the case 10 is supported on a table the two lower support brackets 18 and 20 are pivoted outwardly to a position in which their distal ends rest on the table and stabilize the projector on the table (see FIG. 2).

Figure 3:
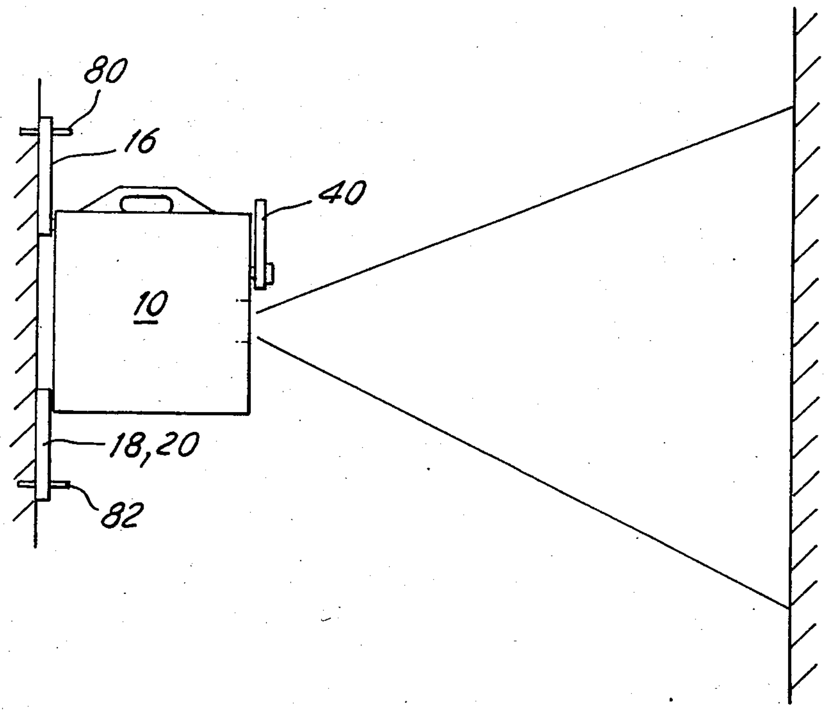
FIG. 3 is a side elevation of the apparatus of the kit to a reduced scale when mounted on a wall.

When the case 10 is supported on a wall the upper and lower support brackets 16 and 18, 20 are pivoted outwardly to the positions shown in FIG. 3 and are secured to the wall by nails, pins, screws or the like. 80, 82.

Instead the three brackets can be secured to the wall by three fasteners when in the configuration (shown in FIG. 2).

The projector 52 is switched on and a slide 72 inserted into the slide carrier 56 to cause the image on the slide to be projected onto the wall. Using pencils 78 the outline of the image is drawn on the wall and thereafter using the brushes 76 and the paints from the containers 66 to 70 the numbered areas are painted with paints according to their number.

The images on the slides consist of a black outline of the characters depicted and defining areas of different colors. In addition, the defined areas may be colored-in on the slides in light pastel colors to give an impression of the mural in its final form.

While numbers are used to designate different areas, it will be appreciated that different designations such as lettering can be used instead.

In another modification the slide projector can be removed from the case and mounted on a support surface such as a table for projecting an image of the slide on a wall.

While a presently preferred embodiment of the present invention has been illustrated and described, modifications and variations thereof will be apparent to those skilled in the art given the teachings herein, and it is intended that all such modifications and variations be encompassed within the scope of the appended claims.

I claim:

1. A kit for producing a wall mural on one of a pair of opposing walls in a room, the apparatus comprising:

a housing defining an opening and a plurality of recesses;

an upper bracket pivotally secured to said housing for securing an upper part of the housing to the other of said pair of walls;

a pair of lower brackets pivotally secured to the housing for securing the lower part of the housing to the said other of said pair of walls;

at least one slide carrying an image to be reproduced on said one wall, the image comprising boundary lines designating areas of different color and a designation in each area corresponding to a designated color for that area;

a slide projector mounted in one of said recesses and so positioned therein as to be able to project the said image of the said slide through said opening on to said one wall;

a plurality of paint containers each containing a different colored paint having a said designated color and each bearing the designation of the color of the paint contained therein;

and a plurality of brushes for painting the said one wall in accordance with the projected image.

2. The kit according to claim 1 wherein the said brushes and the said containers are located in respective recesses in the housing.

3. The kit according to claim 1 further including a protective cover pivotally secured to the housing for closing said opening therein.

4. The kit according to claim 1 further including writing implements in a said recess.

5. The kit according to claim 1 wherein said housing is filled with a block of expanded polystyrene and said block of expanded polystyrene is profiled to define said recesses.

* * * * *